US008358596B2

(12) United States Patent
Byrne et al.

(10) Patent No.: US 8,358,596 B2
(45) Date of Patent: Jan. 22, 2013

(54) COMMUNICATIONS SYSTEM PROVIDING MOBILE WIRELESS COMMUNICATIONS DEVICE APPLICATION MODULE ASSOCIATIONS FOR RESPECTIVE WIRELESS COMMUNICATIONS FORMATS AND RELATED METHODS

(75) Inventors: David James Byrne, Mississauga (CA); Alberto Daniel Zubiri, Richmond Hill (CA); Tomasz Buczek, Oakville (CA); Kevin Paul Fernandes, Toronto (CA); Graham Pancio, Toronto (CA)

(73) Assignee: Research In Motion Limited, Waterloo, Ontario (CA)

( * ) Notice: Subject to any disclaimer, the term of this patent is extended or adjusted under 35 U.S.C. 154(b) by 157 days.

(21) Appl. No.: 13/027,029

(22) Filed: Feb. 14, 2011

(65) Prior Publication Data

US 2012/0069772 A1 Mar. 22, 2012

Related U.S. Application Data

(60) Provisional application No. 61/384,573, filed on Sep. 20, 2010.

(51) Int. Cl.
*H04L 12/28* (2006.01)
*H04B 7/00* (2006.01)

(52) U.S. Cl. ........ 370/255; 370/329; 370/341; 370/338; 455/41.1; 455/41.2; 455/552.1

(58) Field of Classification Search .................. 370/255, 370/329, 341, 338; 455/41.2, 41.1, 426, 455/552.1
See application file for complete search history.

(56) References Cited

U.S. PATENT DOCUMENTS

| 7,242,943 | B2 * | 7/2007 | Rasanen ........................ 455/445 |
| 7,730,484 | B2 * | 6/2010 | von Tetzchner ............... 717/178 |
| 2005/0059345 | A1 * | 3/2005 | Palin et al. .................... 455/41.2 |
| 2009/0247077 | A1 | 10/2009 | Sklovsky et al. ............ 455/41.1 |
| 2010/0081385 | A1 | 4/2010 | Lin et al. ...................... 455/41.3 |
| 2010/0130240 | A1 | 5/2010 | Hart ............................. 455/509 |

OTHER PUBLICATIONS

Ortiz, Enrique "*An Introduction to Near-Field Communication and the Contactless Communication API*" http://java.sun.com/developer/technicalarticles/javame/nfc Sep. 14, 2010.
"*Open NFC for Android—Developer's Manual*" http://www.open-nfc.org/opennfc_library/overview-summary.html Printed Sep. 14, 2010.
U.S. Appl. No. 12/888,642, filed Sep. 23, 2010, Rose et al.
U.S. Appl. No. 13/037,002, filed Feb. 28, 2011, Walker et al.

* cited by examiner

*Primary Examiner* — Robert Wilson
*Assistant Examiner* — Mohamed Kamara
(74) *Attorney, Agent, or Firm* — Allen, Dyer, Doppelt, Milbrath & Gilchrist, P.A.

(57) ABSTRACT

A communications system may include a plurality of electronic devices having respective different device types and each configured to wirelessly communicate via a plurality of different wireless communications formats. The system may also include a mobile wireless communications device including a plurality of application modules associated with respective electronic device types and configured to communicate via a first one of the wireless communications formats. The mobile wireless communications device may further include a control module configured to establish an initial wireless communications link with a given electronic device using a second one of the wireless communications formats, determine a respective device type for the given electronic device based upon the established initial wireless communications link, and cause a respective application module to establish a subsequent wireless communications link with the given electronic device using the second wireless communications format based upon the determined respective device type.

25 Claims, 11 Drawing Sheets

COMMUNICATIONS SYSTEM PROVIDING MOBILE WIRELESS COMMUNICATIONS DEVICE APPLICATION MODULE ASSOCIATIONS FOR RESPECTIVE WIRELESS COMMUNICATIONS FORMATS AND RELATED METHODS

RELATED APPLICATIONS

This application is based upon prior filed provisional application Ser. No. 61/384,573 filed Sep. 20, 2010, the disclosure of which is incorporated herein by reference in its entirety.

TECHNICAL FIELD

This application relates to the field of wireless communications, and more particularly, to wireless communications devices and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multifunction devices usually allow electronic mail (email) messages to be sent and received wirelessly, as well as access the Internet via a cellular network and/or a wireless local area network (WLAN), for example.

Some mobile devices incorporate contactless card technology and/or near-field communication (NFC) chips. NFC technology is used for contactless short-range communications based on radio frequency identification (RFID) standards, using magnetic field induction to enable communication between electronic devices, including mobile wireless communications devices. These short-range communications include payment and ticketing, electronic keys, identification, device set-up service and similar information sharing. This short-range high frequency wireless communications technology exchanges data between devices over a short distance, such as only a few centimeters.

DETAILED DESCRIPTION

Figure 1:
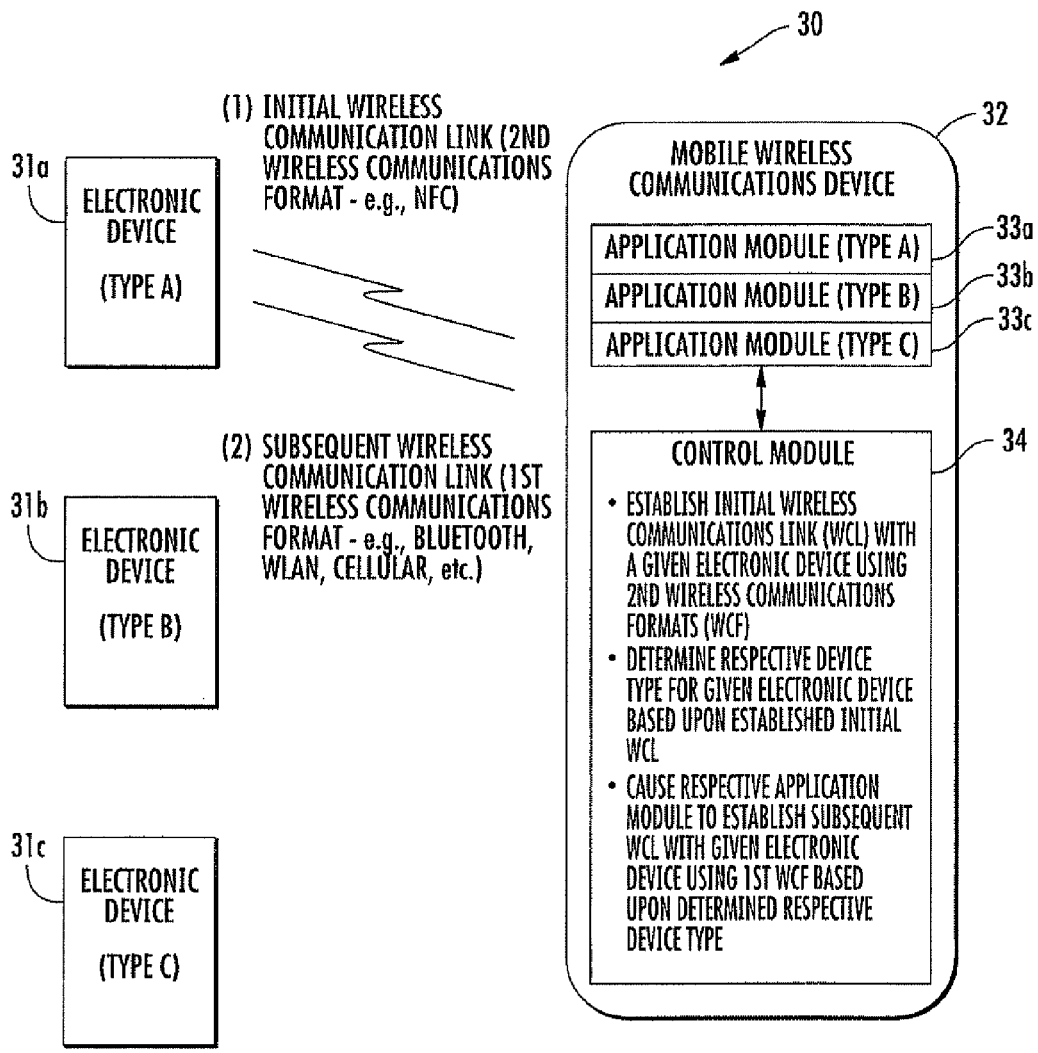
FIG. 1 is a schematic block diagram of a communications system in accordance with one example aspect.

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete.

Generally speaking, a communications system is provided herein which may include a plurality of electronic devices having respective different device types, and each electronic device may be configured to wirelessly communicate via a plurality of different wireless communications formats. The communications system may also include a mobile wireless communications device comprising a plurality of application modules associated with respective electronic device types and configured to communicate via a first one of the wireless communications formats. The mobile wireless communications device may further include a control module configured to establish an initial wireless communications link with a given electronic device using a second one of the wireless communications formats, determine a respective device type for the given electronic device based upon the established initial wireless communications link, and cause a respective application module to establish a subsequent wireless communications link with the given electronic device using the second wireless communications format based upon the determined respective device type. Accordingly, enhanced efficiencies of wireless communication handovers between different communications formats may be achieved, for example.

By way of example, the second wireless communications format may comprise a near-field communication (NFC) format, while the first wireless communications format may comprise a Bluetooth format, a wireless local area network (WLAN) format, a cellular communications format, etc. Moreover, the application modules may be further configured to register respective electronic device types with the control module. Also, the plurality of application modules may comprise at least one of an image application module, a video application module, an audio module, an Internet browser module, etc.

A mobile wireless communication device, such as the one described briefly above, and a related communications method are also provided. The method may include establishing an initial wireless communications link between a mobile wireless communications device and a given electronic device, where the mobile wireless communication device comprises a plurality of application modules associated with respective electronic device types and configured to communicate via a first one of the wireless communications formats. The initial wireless communications link may be established using a second one of the wireless communications formats. The method may further include determining a respective device type for the given electronic device based upon the established initial wireless communications link, and establishing a subsequent wireless communications link between a respective application module and the given electronic device using the second wireless communications format based upon the determined respective device type.

A related computer-readable medium for a mobile wireless communication device is also provided. The computer-readable medium may have computer-executable instruction modules comprising a plurality of application modules associated with respective electronic device types and configured to communicate via a first one of the wireless communications formats, and a control module. The control module may be configured to establish an initial wireless communications link with a given electronic device using a second one of the wireless communications formats, determine a respective device type for the given electronic device based upon the established initial wireless communications link, and cause a respective application module to establish a subsequent wireless communications link with the given electronic device using the second wireless communications format based upon the determined respective device type.

Figure 2:
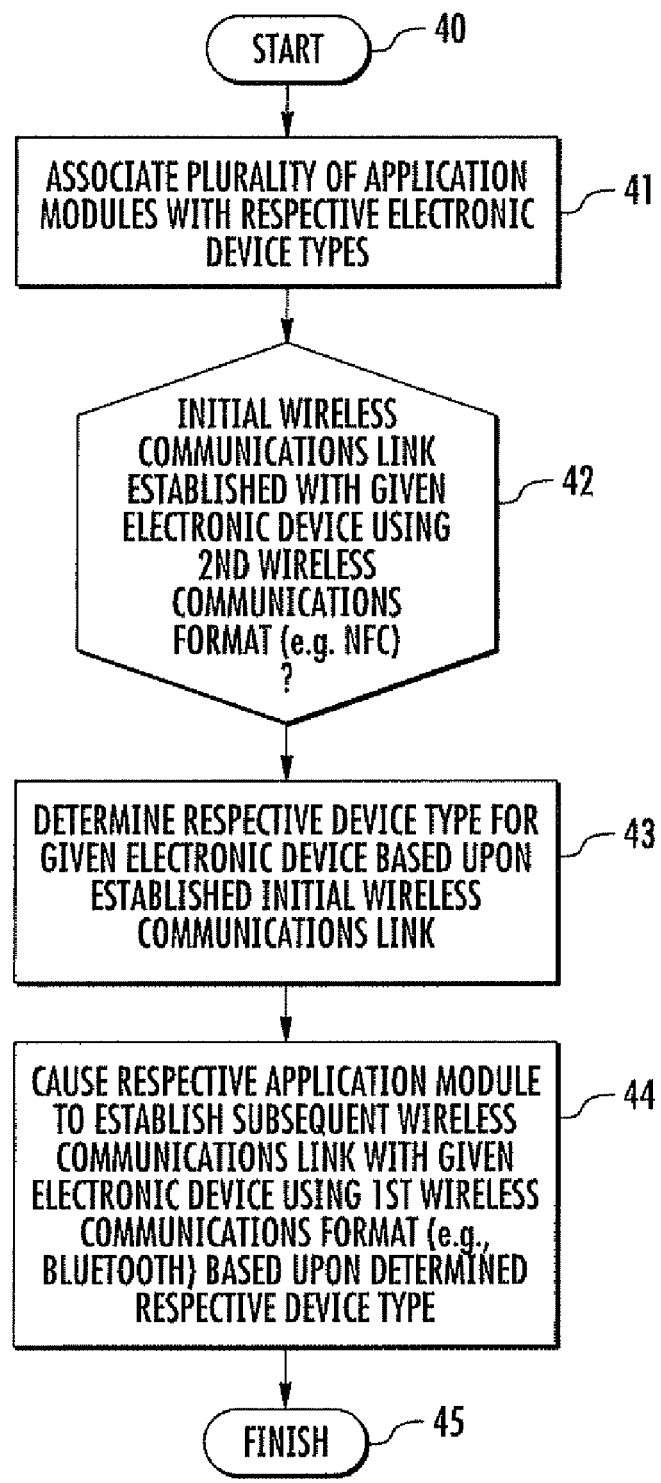
FIG. 2 is a flow diagram illustrating method aspects associated with the communications system of FIG. 1.

Referring initially to FIGS. 1 and 2, a communications system 30 and related method aspects are first described. The system 30 illustratively includes a plurality of electronic devices 31a-31c having respective different device types, and each electronic device 31a-31c is configured to wirelessly communicate via a plurality of different wireless communications formats. By way of example, the electronic devices 31a-31c may be of different types such as media (e.g., video, audio, etc.) players, displays, gaming devices, telephones, point-of-sale (POS) terminals, etc. Moreover, the electronic devices 31a-31c may be implemented as portable or mobile devices, as well as stationary devices, in different embodiments.

Also by way of example, the different wireless communications formats, standards or protocols may include a near-field communication (NFC) format, a Bluetooth format, a wireless local area network (WLAN) format, a cellular communications format, etc. By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used.

Beginning at Block 40, the communications system 30 also illustratively includes a mobile wireless communications device 32 which comprises a plurality of application modules 33a-33c that are associated with respective electronic device types (here, types A, B, or C), at Block 41. Moreover, the application modules 33a-33c are configured to communicate via a first one of the wireless communications formats. For the present example, Bluetooth will be used as the first wireless communications format, but other formats, such as those described above, may also be used. Also by way of example, the application modules 33a-33c may comprise media application modules such as for images, videos, audio, or a combination thereof. Other application modules may include Internet browser modules, document processing modules, social networking modules, electronic commerce modules, etc. The application modules 33a-33c may also be considered as mobile software applications or "apps" from the device manufacturer or third party developers, which take the form of software modules comprising computer-executable instructions stored on a computer-readable medium. Example types of mobile wireless communications devices 32 may include portable or personal media players (e.g., MP3 players, video players, etc.), remote controls (e.g., television or stereo remotes, etc.), portable gaming devices, portable or mobile telephones, smartphones, tablet computers, etc.

By way of example, the application modules 33a-33c may be associated with respective electronic device types by registration. That is, the application modules 33a-33c may be further configured to register respective electronic device types with a control module 34 of the mobile wireless communications device 32, such as upon installation, for example, as will be discussed further in the accompanying Appendix A.

The control module 34 may be configured to establish an initial wireless communications link with a given electronic device 31a using a second one of the wireless communications formats (Block 42), which for the present example is NFC, although other formats may also be used in different embodiments. Thus, for example, upon swiping or bumping the mobile wireless communications device 32 with the electronic device 31a, these devices establish an NFC communications link therebetween. Upon establishing of this link, the control module 34 determines a respective device type for the given electronic device 31a based upon the established initial NFC wireless communications link, at Block 43, and causes a respective application module 33a to establish a subsequent wireless communications link with the given electronic device using the second wireless communications format (e.g., Bluetooth in the present example) based upon the determined respective device type.

In one example use case, the given electronic device 31a may comprise a POS terminal, such as at a retail store, and the application module 33a may comprise an electronic payment application module (e.g., a PayPal™ app, Visa™ app, American Express® app, etc.). Upon swiping or bumping of the mobile wireless communications device 32 with the POS terminal 31a, the control module 34 may alert the electronic payment application module 33a of the POS terminal so that the electronic payment application module may initiate or otherwise establish a Bluetooth (or other) connection with the POS terminal to complete an electronic payment operation.

The various operations or functions of the control module 34 described herein may be implemented as part of an example application programming interface (API). An example API for a BlackBerry® mobile device architecture from Research In Motion Limited (RIM) is provided below, although it will be appreciated that the various elements and operations described herein may be used with other mobile device architectures as well.

Example BlackBerry NFC API

Feature Description
    Near Field Communication (NFC) is used for contactless communication between devices and tags/cards. It has a range of roughly 10 cm, operates at 13.56 Mhz, and supports transfer speeds of 106 Kbps, 212 Kbps and 424 Kbps.
    Support for NFC opens up a range of new capabilities for the BlackBerry. Some of the use cases we will be able to support include:
    Bluetooth/Wifi pairing
    NFC based contact exchange
    Reading and writing Tags/Smart Posters/Content Discovery
    Contactless payment (VISA, Mastercard etc)
    Physical/Logical access control
    Ticketing (event, transit, parking etc.)
    A Bluetooth connection handover feature may be implemented in Java The document covers MRD [1] 6.7.1 NFC-AP001—NFC API requirement.
Overall Architectural Impact
    The Java layer will be communicating with native layer over the bridge. It will call into a NFC driver that runs inside user mode process.
BES Impact
    IT Policy may be updated to give BES administrators a way to enable/disable the following NFC features:
    NFC (entire system)
    Tag Reading
    Tag/Card Emulation
    Peer to Peer
Overall Design
    The API covers tag emulation, tag reading, tag writing, and peer to peer connections. All of these could potentially be requested by multiple applications concurrently.

Tag/Card Emulation
  Both Secure Element based card/tag emulation, and baseband card/tag emulation are supported, but each may have a different API. One tag or card may be emulated at a time. Also, the foreground application may be allowed to perform card emulation. Once that application moves to the background, it may lose the ability to emulate a card or tag.
  The baseband card/tag emulation API will provide simple stopping and starting of emulation as well as a method to check if a target is currently being emulated. There will be an internal API method to stop tag emulation.
  The Secure Element based API will allow applications to determine what secure elements are present (embedded and/or SIM), activate or deactivate each one, and set the technology type used. JSR 177 is used for APDU based interaction with the Secure Elements.
Tag Reading
  The API will provide 2 levels of event registration, one for Tag detection events, and one for NDEF record detection events. Applications can decide which approach makes sense for them.
  Multiple applications may be registered to detect tags. Tag detection events may be sent to all of the currently running listeners registered for that type of NFC event.
  The NDEF Record detection registration methods have an "autostart" boolean parameter that indicates whether the registering application should be started if it is not running at the time a matching event occurs. If the foreground application is registered to handle any NDEF record on the tag, we assume that no other application needs to be started. If there is only one matching autostart application, that one is started. One application may be started per tag read. If there are multiple matching applications, we may check to see if the user previously configured a default application for any of the NDEF record types on the tag, and start the default application. If there is not exactly one default application, the user may select which one they want to start. They may indicate that this is the application they want to start in future for the same NDEF record type.
Tag Writing
  For the case of writing to tags, we may allow one application to connect to one tag at a time. If another Connection is attempted to the tag in the same detection cycle, the API will throw an NFC exception.
Peer to Peer Connections
  More than one peer to peer connection may be active at a time on the device. Peer to Peer connections will need to have a unique connection type-service name pair (note that the same service name may be used for a client and a server connection on a device). We will restrict access to any LLCP service name that begins with "urn:nfc:sn:RIM" to internal applications signed with 3.key.
Connection Handover
  NFC based connection handover [2,6] is supported. Initially we will only support Bluetooth, but the API is designed to handle other transports in the future if required.
  To support the requested user experience flows, there will be a Connection Handover process that is almost always running. (It may be disabled/turned off from time to time due to conflicts with a card emulation request). It will use the NFC APIs to do the following:
    Listen for incoming LLCP BT NDEF messages on service name "urn:nfc:sn:handover"
    Attempt to establish an LLCP connection on service name "urn:nfc:sn:handover"
    Register as a reader for connection handover NDEF Messages.
  The Connection Handover process may support Bluetooth Connection Handover. The Connection Handover happens automatically when two Bluetooth devices are tapped. The Connection Handover process pops up a dialog box to the user asking if they want to proceed with the pairing.
  3rd party applications may register to be notified about Bluetooth Connection Handover "tap" events. Each application may determine their own context and establish the Bluetooth connection if necessary.
Content Dispatching/Launching of Applications
  We will provide a mechanism to allow applications to register a persistent interest in specific NDEF RTDs and then exit. When the NDEF data dispatcher sees a tag that matches the registration, it will launch the application and send the NDEFMessage to it for processing.
  Because of the very short duration of an NFC "tap" and the length of time it takes for an application to load, this feature will not be available for target detection listeners.
JSR 257
  The BlackBerry NFC API may support the same functionality that JSR 257 supports.
JSR 177
  JSR-177 support may be provided for the SIM card for SATSA-APDU, SATSA-RMI, and access control files. Support may be added for JSR-177 for the embedded secure element for SATSA-APDU.
Device Capability API Integration
  The NFC API will integrate with the existing Device Capability API. A new DeviceCapability.TYPE_NFC constant may be defined, and the NFC subsystem may register its availability with the Device Capability API on startup. Additionally the NFC subsystem will notify any DeviceCapability API NFC listeners when NFC is enabled or disabled.
Managing NFC Service Conflicts
  Due to the nature of NFC, and underlying hardware limitations, all combinations of NFC operations may not be possible by multiple applications concurrently.
  The NFC Manager may resolve the conflicts. Requests may fail with an NFCException if they cannot be satisfied. Alternatively a request may succeed, and another application may lose access to some part of the NFC API. In this case that application will receive a notification via an NFCStatusListener.
  The default rule for resolving conflicts is that the first request for a resource should succeed, and that any conflicting requests should fail. The first application will retain the resource until it gives it up.
  In order to help manage the conflicts, we may provide an internal API that allows RIM application to configure certain NFC services as "Foreground Only", meaning that applications that are in the foreground can use them, and when they move to the background, they will lose access to them.
  Tag/Card emulation and Secure Element based operations may be available to the foreground application. NFC peer to peer operations may be available to all applications, both foreground and background, however they may not be able to be performed while a foreground application is using Tag/Card emulation or Secure Element based emulation.

Figure 3:
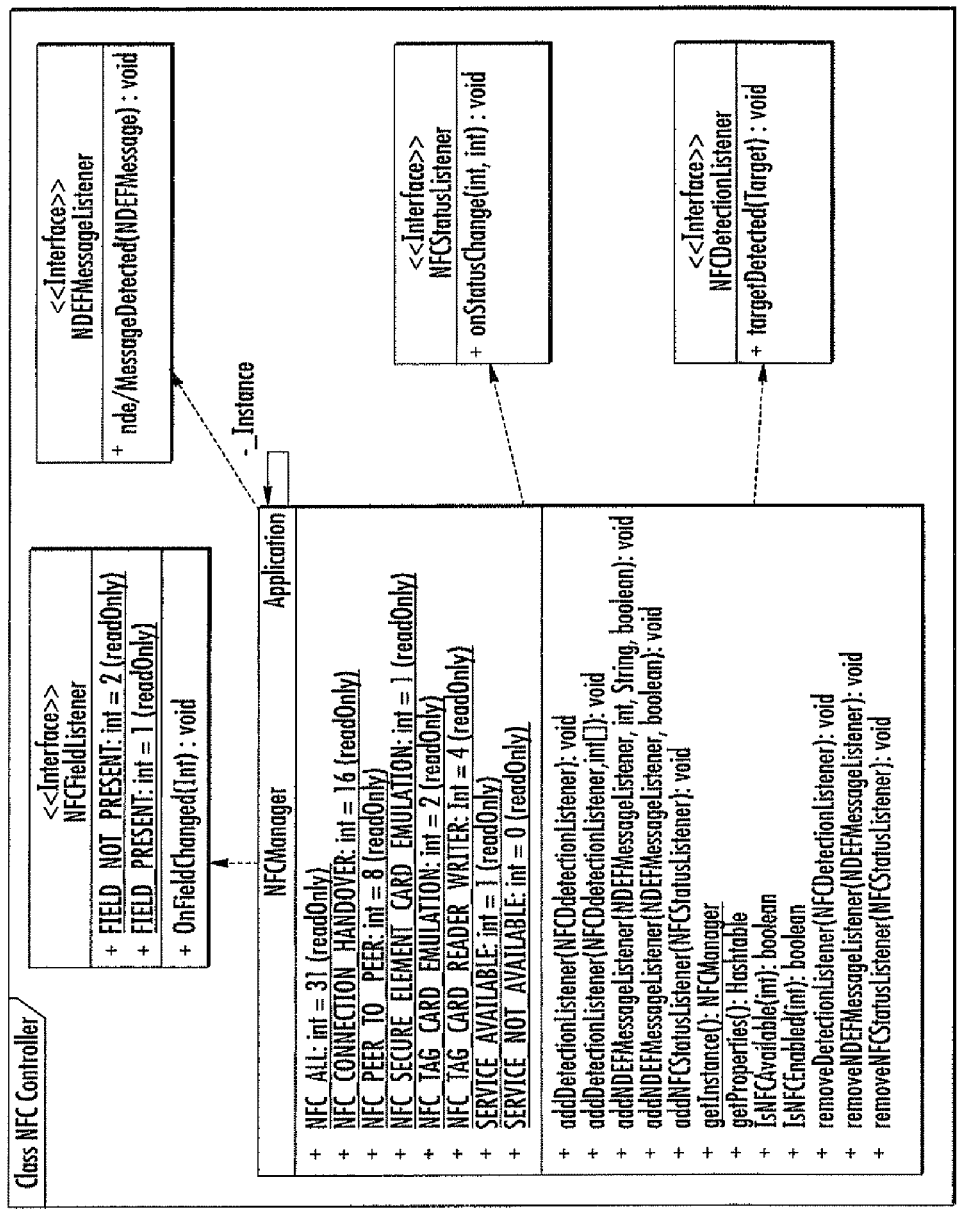
FIGS. 3-10 are class interface diagrams for an example implementation of the system of FIG. 1.
Figure 4:
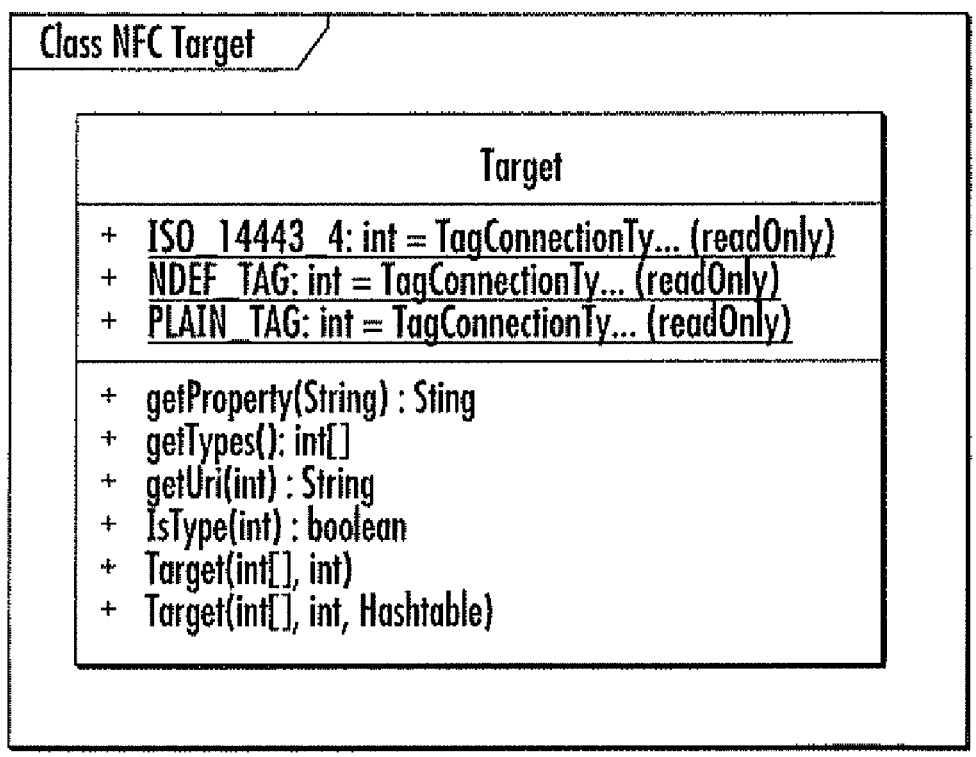
Figure 5:
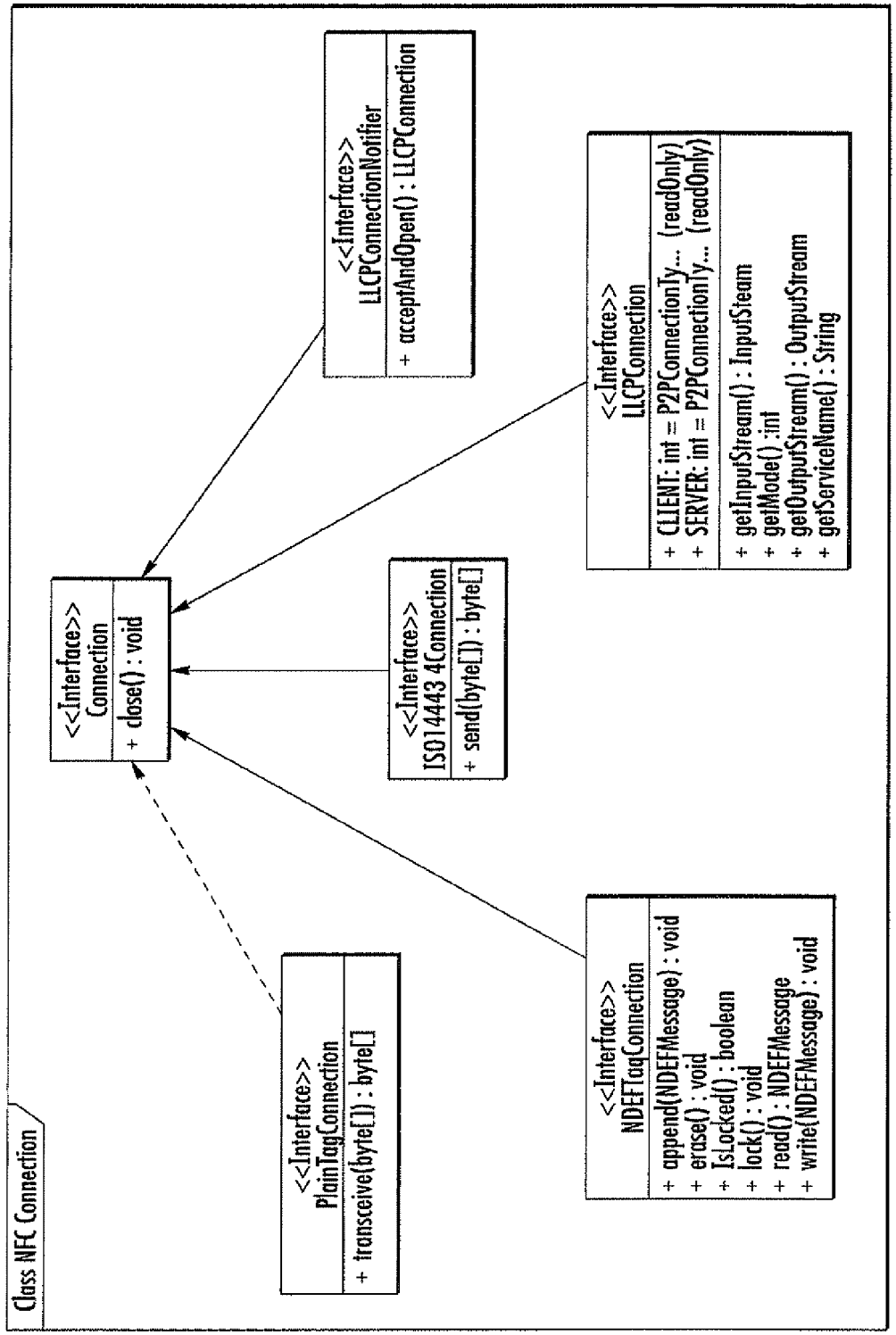
Figure 6:
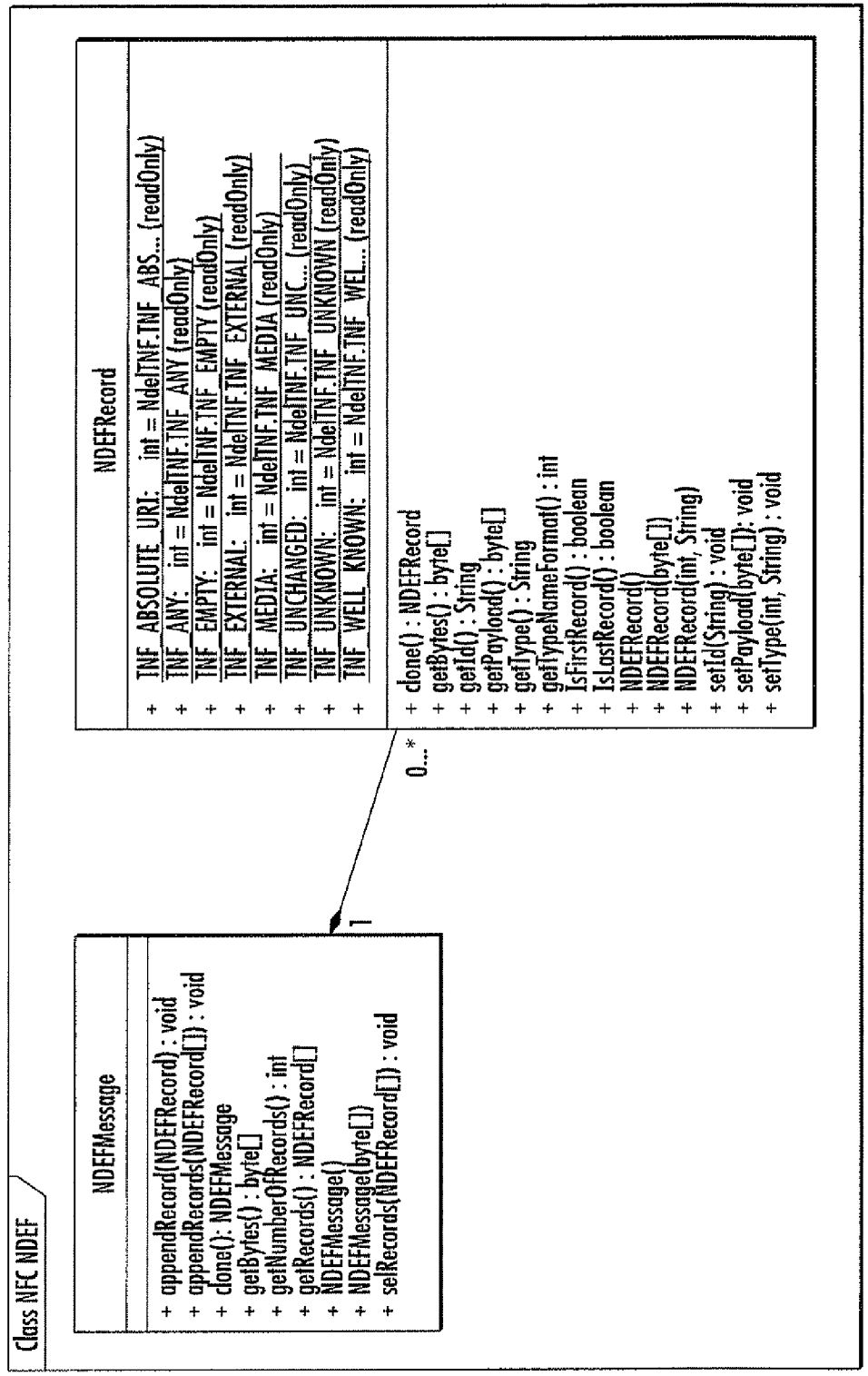
Figure 7:
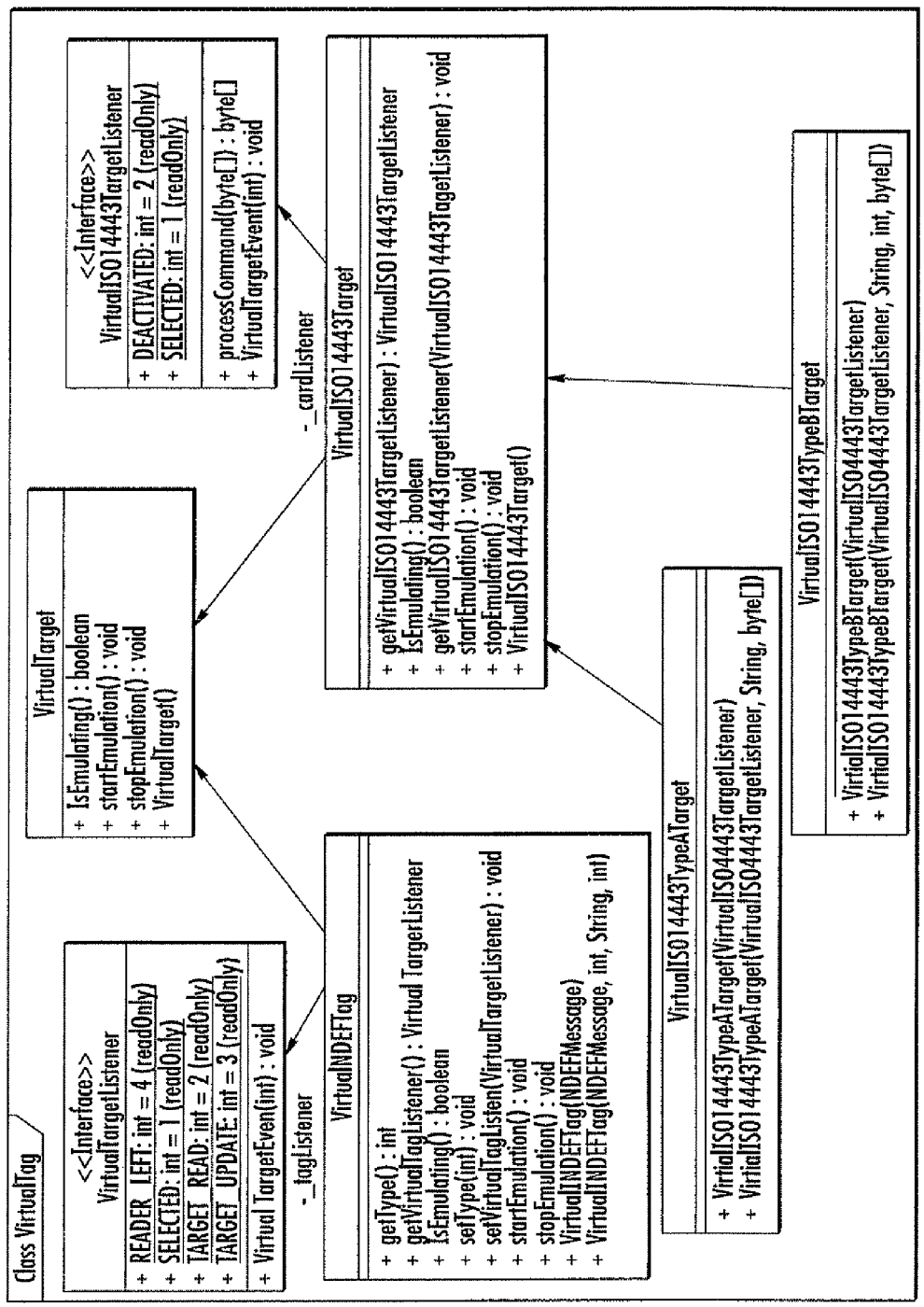

Configuration of NFC Services
    An internal API may be provided for enabling or disabling all or part of the NFC subsystem. The following pieces may be enabled/disabled separately or together:
    Secure Element based emulation
    Tag/Card emulation
    Tag/Card reader/writer
    Peer to peer
    Connection Handover
Operation of API on Devices where NFC is not Supported
    The DeviceCapabilityManager API may be used to query if NFC is available on a device. If an application tries to call this API when NFC is not available, an NFC exception may be thrown.
Operation of API on NFC Device that is Holstered/Locked
    For security reasons, and also to save on battery usage, we may not want to initiate or receive NFC taps while the device is holstered, password locked, screen locked, or when the backlight is off. The NFCManager may register listeners to track these events and enable/disable the operation of the NFC feature accordingly. If an NFC API is accessed when it is disabled, an NFCException may be thrown.
Package
    All classes and interfaces related to NFC are under: net-.rim.device.api.io.nfc
Classes (See FIG. 3)
NFCManager
    The NFCManager is the main entry point to the NFC API. It is also responsible for determining and resolving any conflicts between requested NFC operations.
NDEFMessageListener
    Classes implementing this interface will be notified when a matching NDEF message has been retrieved from a tag. NFCManager.addNDEFMessageListener (NDEFMessageListener listener, int typeNameFormat, String recordType, boolean autostart) allows applications to be notified when specific NDEF record type is detected. The autostart parameter indicates whether the registered application should be started if it is not running when the NDEF message is detected.
NFCDetectionListener
    This interface defines the call back that an application will receive when a matching target is detected by the NFC system. An NFCDetectionListener is registered with NFCManager's addDetectionListener(NFCDetectionListener listener, int[ ] type) method.
NFCStatusListener
    This interface defines the call back that an application will receive when the availability of NFC services for the application is detected. An NFCStatusListener is registered with NFCManager's addStatusListener(NFCStatusListener listener method.
FieldListener
    This interface defines the call back that an application will receive when the device is introduced to, and removed from, an NFC RF field. A FieldListener is registered with NFCManager's addFieldListener(FieldListener listener method. (See FIG. 4)
Target
    Target represents a card/tag that was detected by NFC. It also identifies a type of contactless protocol that is used to connect to the card. The API groups contactless protocols in four categories (from the lowest layer):
    ISO_14443_4 covers ISO 14443 A-4, B-4.
    PLAIN_TAG covers ISO 14443 A-3, B-3, which includes MIFARE, and PICOPASS based cards.
    NDEF_TAG covers NFC Forum tags type 1, 2, 3 and 4, which have been formatted for NDEF.
    getTypes( ) returns an array of all supported connection types for this target.
    getUri(int connectionType) returns URI that needs to be passed to Connector.open( ) to open a connection to the card/tag.
    getProperty( ) returns the value of a requested target property. These properties have not yet been defined, but will likely vary by target type. At a minimum each target should have a "Name" property.
If there is more than one target type specified in a call to NFCManager's addDetectionListener( ) method, that NFCDetectionListener's detectedTarget( ) method will still only be called once for a target that matches more than one type. (See FIG. 5).
ISO14443_4Connection
    Supports interactions with tags/cards using ISO14443-4.
NDEFTagConnection
    Allows reading from and writing to NFC Forum formatted data tags with an NDEF data model API.
LLCPConnection
    Supports peer to peer LLCP[5] connection functionality.
PlainTagConnection
    Supports reading and writing of tags by sending ISO14443-3 commands and the reading responses. This is the lowest level of tag access and requires knowledge of the command set for the tag. (See FIG. 6).
NDEFMessage
    NDEFMessage is a container for an array of NDEFRecords. Once all the records are in place, it provides a way to get the byte representation for writing to a tag or NFC P2P connection.
NDEFRecord
    Contains the payload data in an NDEFMessage. Provides methods for building up the bytes in the expected format. (See FIG. 7).
VirtualTarget
    This class represents a tag or card that is being emulated. It provides methods for starting and stopping emulation, as well as checking its type (A or B).
VirtualISO14443TypeATarget
    This is a subclass of VirtualTarget and class represents an ISO 14443 Type A tag or card that is being emulated.
VirtualISO14443TypeBTarget
    This is a subclass of VirtualTarget and class represents an ISO 14443 Type B tag or card that is being emulated.
VirtualTarget
    This class represents a tag or card that is being emulated. It provides methods for starting and stopping emulation, as well as checking its type (A or B).
VirtualNDEFTag
    This class is used for emulating an NFC Forum NDEF tag. It provides methods for setting its NDEF contents, and registering a listener to receive callbacks.
VirtualISO14443Target
    This class covers all non-NDEF emulation cases. It can be used to emulate cards or tags. The associated VirtualISO14443TargetListener instance is responsible for generating suitable responses for incoming command bytes. Note that this class is not intended to be used for secure card emulation (see SecureElementManager instead).

VirtualTargetListener
   This interface defines the call backs that an application will receive when one of the following virtual target events occur: target selected, target read, target updated, or reader left.

Figure 8:
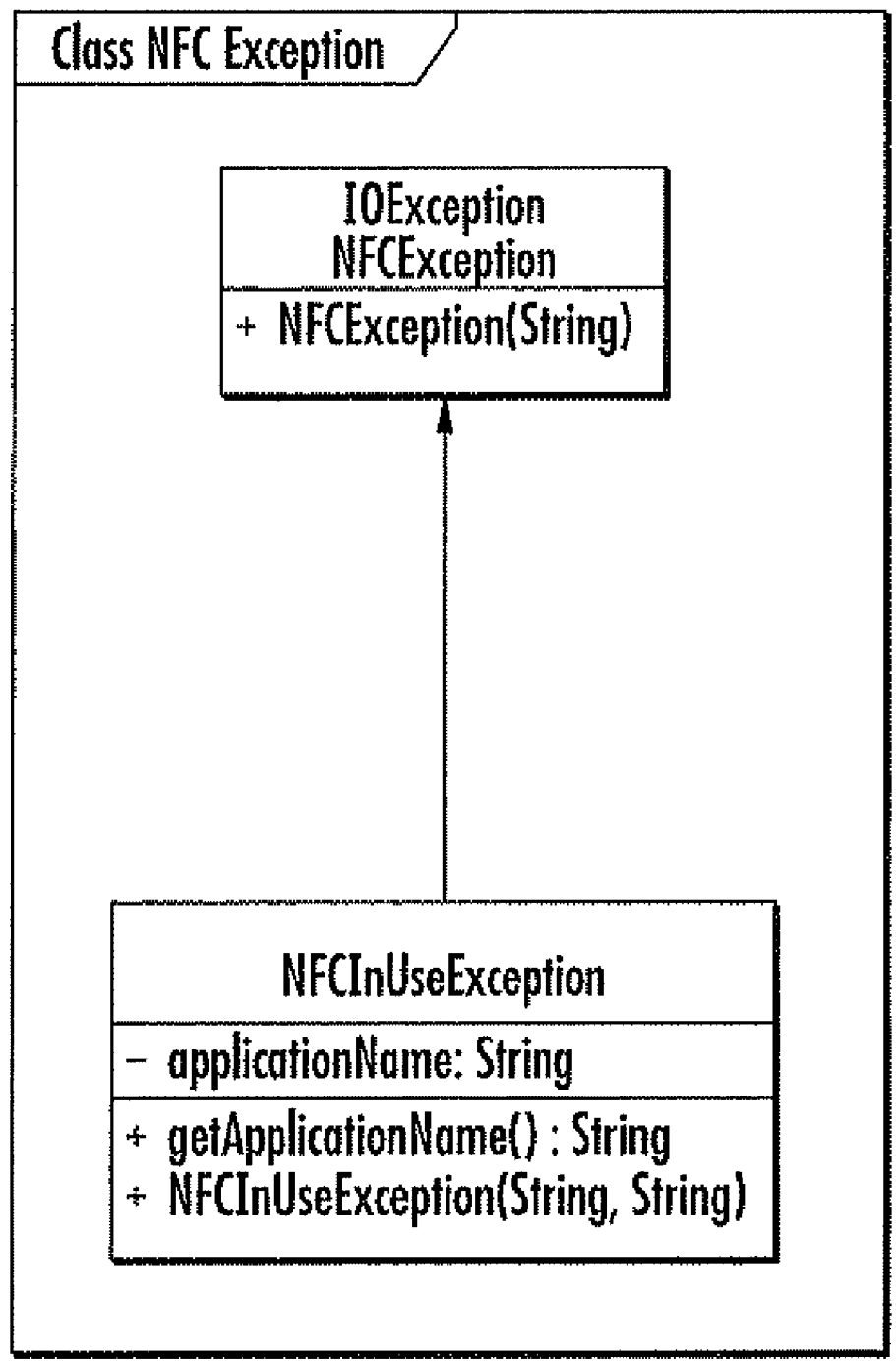

VirtualISO14443TargetListener
   This interface defines the callbacks that an application will receive when a virtual tag event occurs. It extends the VirtualTargetListener interface and adds a method for responding to external reader commands. (See FIG. 8)

NFCException
   Base class for all NFC Exceptions.

Figure 9:
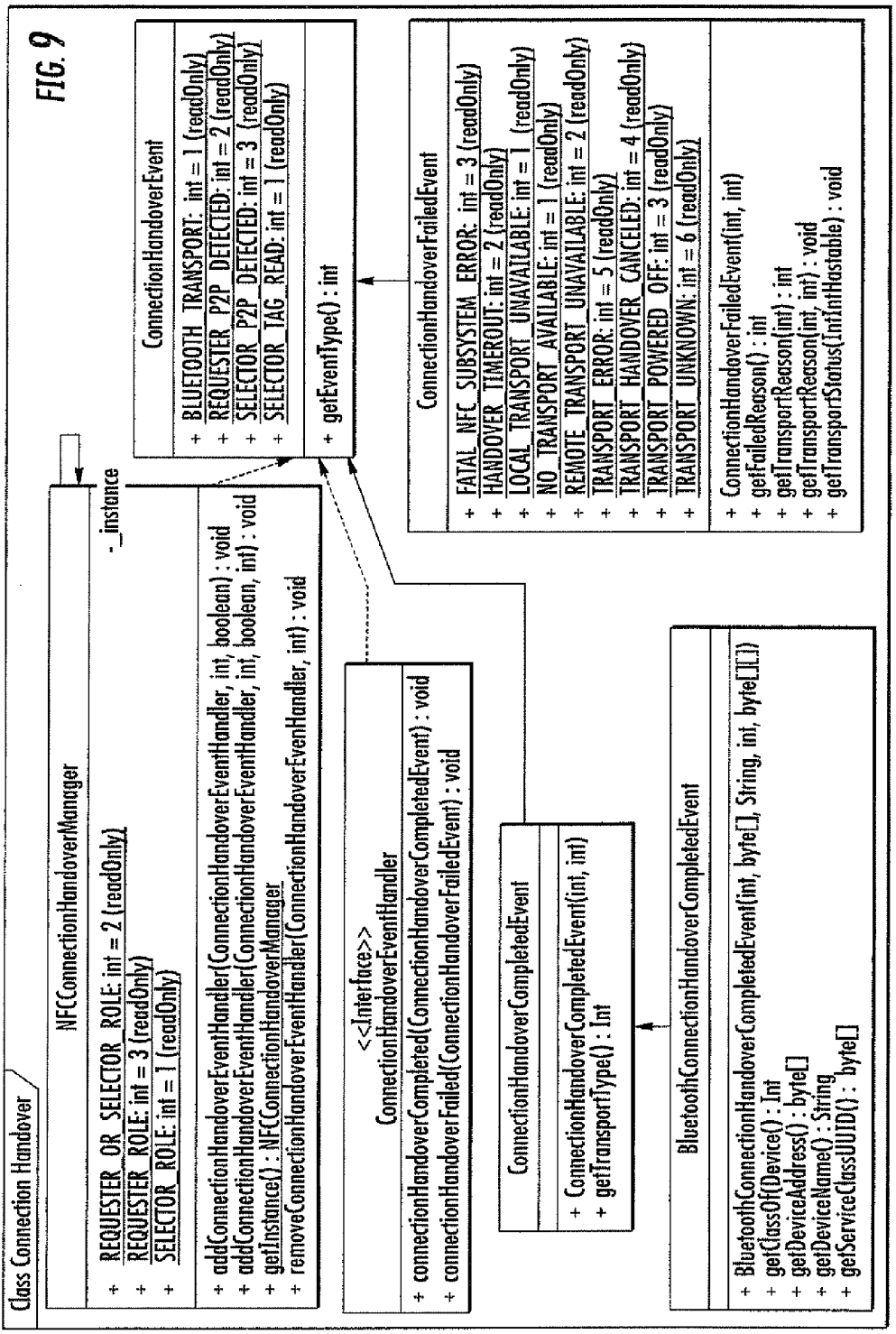

NFCInUseException
   NFC Exception that is thrown when an NFC service cannot be provided because a requested resource is in use. (See FIG. 9).

NFCConnectionHandoverManager
   This class is a point of entry for initiating or configuring connection handover behaviour. API allows registration of connection handover listeners for 3rd party applications so that they can be notified when a Bluetooth connection is advertised or negotiated over NFC, and also if a connection handover fails for some reason. Support for transports other than Bluetooth may be added in the future.

ConnectionHandoverEventHandler
   This is the interface that 3rd party applications use to receive notifications about connection handover events triggered by NFC. It is up to each application to decide what action the user intended by the tap.

ConnectionHandoverEvent
   Abstract base class for all connection handover events.

ConnectionHandoverCompletedEvent
   Base class for all connection handover completion events.

ConnectionHandoverFailedEvent
   Class representing a connection handover failure events. Contains data that allows the listener to determine why the failure occurred.

Figure 10:
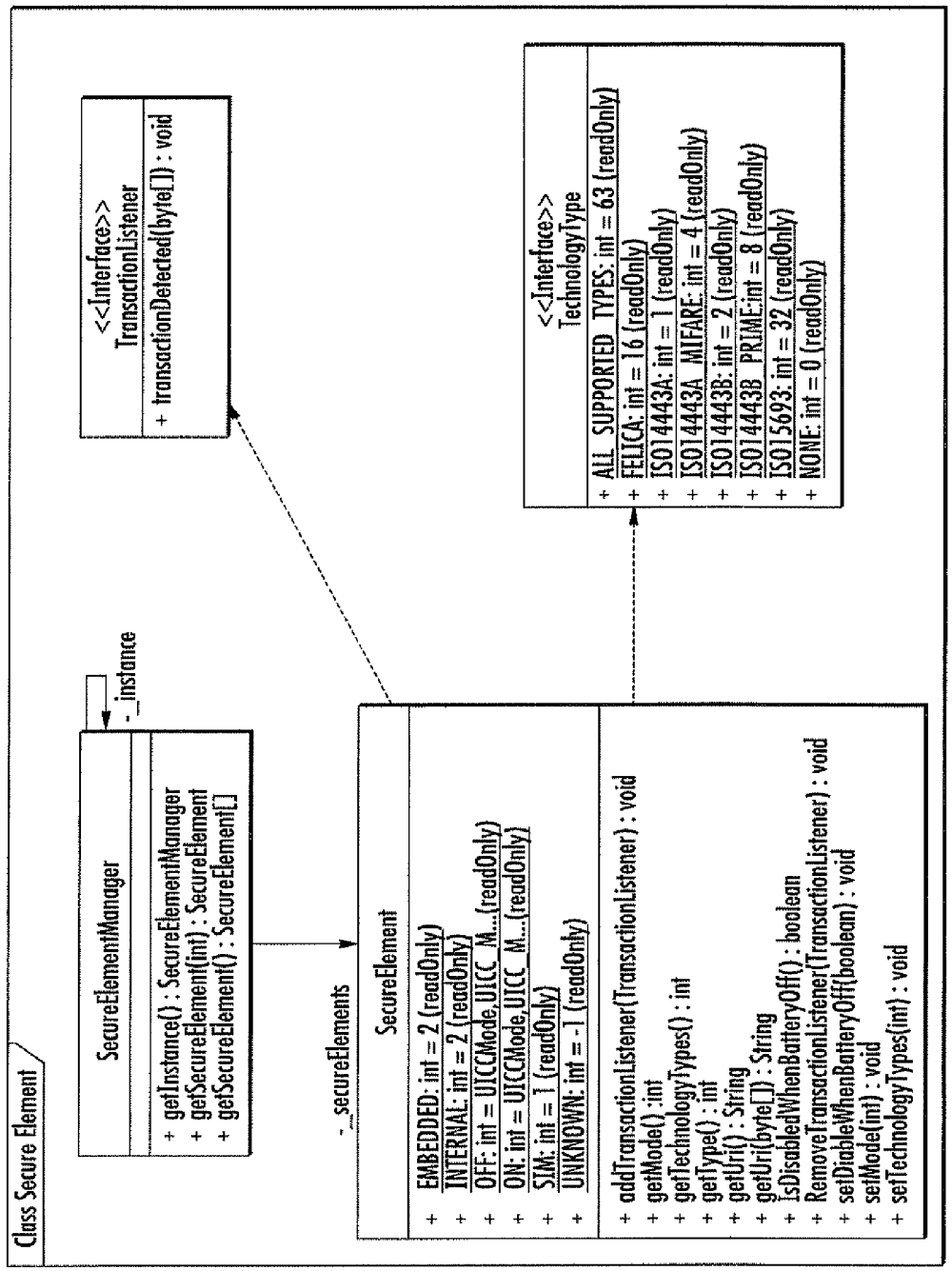

BluetoothConnectionHandoverCompletedEvent
   This class extends ConnectionHandoverCompletedEvent and adds Bluetooth specific information so that the 3rd party application can establish the Bluetooth connection if it wishes. (See FIG. 10).

SecureElementManager
   This class is the entry point for querying/managing all secure elements available on the device.

SecureElement
   This class represents a single secure element. It provides public methods for getting type, connection information, mode, as well as updating the mode and associating a transaction listener with the secure element. Valid modes for the secure element are:
     ON. The Secure Element is available to applications running on the BlackBerry and external readers
     OFF. The Secure Element is not available to applications running on the BlackBerry or external readers.
     INTERNAL. The Secure Element is only accessible by applications running on the BlackBerry. Only supported by embedded secure element.

TechnologyType
   This interface contains constants for all of the supported technology types.

TransactionListener
   This callback interface is invoked when an active secure element is accessed. This allows application to monitor activity and perform some application specific logic such as query SE for new state.

System Features
NFC Tag Reading/Writing API
Overview
   The tag reader API allows applications to detect and read/write NDEF tags as well as send raw tag commands to non NDEF tags/cards.

Description
   One way to discover and read a tag is to register one or more listeners for tag detection. When the tag is detected in the RF field, the listeners are invoked. The listener implementations will be responsible for connecting to the tag and reading the data.
   Another approach is to use NDEFMessageListener. When an NDEF tag with a specific NDEF record is detected, entire NDEF message is passed to a callback. This approach does not require connecting to a tag but it also does not support writing to a tag. An additional advantage of this approach, is that it can be used to autostart an application to consume the NDEF message. This feature is not available for Connection oriented tag interactions because of the delay introduced by launching an application.
   Applications will be able to register their persistent interest in an NDEF record via custom properties in a JAD file. Entries will follow the format NDEFMessageListener.[TNF].[Type]=Class name eg. NDEFMessageListener.2.text/plain=com.my.ndef.listener.MyNDEFListener
   These properties will be read when the application is installed and the registration will be initialized at that time. The persistent listener registrations will be removed when the application is uninstalled.

Use Cases
Application Detects and Reads an NDEF Tag

```
NFCManager nfc = NFCManager.getInstance( );
try {
    nfc.addDetectionListener(new NFCDetectionListener( )
{
        public void targetDetected(Target target) {
            NDEFTagConnection c = null;
            try {
                c = (NDEFTagConnection)Connector.open(
target.getUri(Target.NDEF_TAG));
                NDEFMessage ndefMessage = c.read( );
                NDEFRecord[ ] ndefRecords =
ndefMessage.getRecords( );
                // do something with the NDEF records
here
            } catch (IOException e) {
                // error handling here
            } finally {
                try {
                    if (c != null)
                        c.close( );
                } catch (IOException e) {
                }
            }
        }
    }, new int[ ]{Target.NDEF_TAG});
} catch (NFCException e) {
    // TODO
}
```

Application Writes to an NDEF Tag

```
NFCManager nfc = NFCManager.getInstance( );
try {
```

```
        nfc.addDetectionListener(new NFCDetectionListener( )
{
        public void targetDetected(Target target) {
            NDEFTagConnection c = null;
            try {
                c = (NDEFTagConnection)Connector.open(
target.getUri(Target.NDEF_TAG));
                NDEFMessage ndefMessage = new
NDEFMessage( );
                NDEFRecord rec1 = new NDEFRecord( );
                rec1.setId("1");
                rec1.setType(NDEFRecord.TNF_MEDIA,
"text/plain");
                rec1.setPayload("zxczxczxc".getBytes( ));
                NDEFRecord rec2 = new NDEFRecord( );
                rec2.setId("2");
                rec2.setType(NDEFRecord.TNF_MEDIA,
"text/plain");
                rec2.setPayload("12345678".getBytes( ));
                ndefMessage.setRecords(new
NDEFRecord[ ]{rec1, rec2});
                c.write(ndefMessage);
            } catch (IOException e) {
                // error handling here
            } finally {
                try {
                    if (c != null)
                        c.close( );
                } catch (IOException e) {
                }
            }
        }
    }, new int[ ]{Target.NDEF_TAG});
} catch (NFCException e) {
    // TODO
}
```

Application Accesses a Tag Using PlainTagConnection

```
        NFCManager nfc = NFCManager.getInstance( );
        try {
            nfc.addDetectionListener(new NFCDetectionListener( )
{
            public void targetDetected(Target target) {
                PlainTagConnection c = null;
                InputStream in = null;
                try {
                    c = (PlainTagConnection)Connector.open(
target.getUri(Target.PLAIN_TAG));
                    // send request bytes to tag and get
response
                    byte[ ] response = c.transceive(
new byte[ ] {0,1,2,3,4});
                } catch (IOException e) {
                    // error handling here
                } finally {
                    try {
                        if (in != null)
                            in.close( );
                    } catch (IOException e) {
                    }
                    try {
                        if (c != null)
                            c.close( );
                    } catch (IOException e) {
                    }
                }
            }
        }, new int[ ]{Target.PLAIN_TAG});
    } catch (NFCException e) {
        // TODO
    }
```

Application Detects a Tag with Specific NDEF Record

```
    NFCManager nfc = NFCManager.getInstance( );
    try {
        nfc.addNDEFMessageListener(new NDEFMessageListener( )
{
        public void ndefMessageDetected(NDEFMessage msg)
{
            NDEFRecord[ ] ndefRecords = msg.getRecords( );
            // do something with the NDEF record here
        }
    }, NDEFRecord.TNF_MEDIA, "text/plain", true);
} catch (NFCException e) {
    // TODO
}
```

Handheld Impact
  The handheld device may include an NFC chip that supports this feature.
System Security
  The following security checks may be done internally to verify that applications are allowed to access the NFC tag reader/writer APIs:
  Application Control: Enable/Disable NFC
  IT Policy: Enable/Disable NFC
  IT Policy: Enable/Disable NFC Tag Read/Write mode
Other Tools Impact
  Fledge device simulator may need to be extended to support emulation of NFC tag reading functionality.
NFC Tag/Card Emulation API
Overview
  The tag/card emulation API will allow devices to act as if they were RFID tags and interact with NFC readers accordingly. Two flavors of emulation are provided, Virtual NDEF Tag, and Virtual ISO14443 Target.
  For secure card emulation, the API will support detection and setting the mode of available secure elements, letting the emulation be done by an application running on the secure element. Note that secure card emulation and regular tag/card emulation cannot happen at the same time.
Description
  NDEF tag emulation is done by initializing a VirtualNDEFTag with an NDEFMessage. A listener can be attached to the virtual tag to monitor tag events if desired. Emulation is started by invoking startEmulation( ) on the tag instance. Card emulation is done by constructing a VirtualISO14443TypeATarget or VirtualISO14443TypeBTarget with a VirtualISO14443Target Listener, and invoking startEmulation( ) on the target instance. The listener will be notified about any incoming commands, and is responsible for generating the responses.
  For payment and other high value use cases, card emulation via a secure element is recommended/expected. This API provides a way to check what secure elements are present on a device, and enable one of them. JSR 177 may be used for the actual APDU interaction with the secure element.
  One target can be emulated by the device at a time, and the application attempting the emulation operation must be running in the foreground. Note that this applies to secure element based card emulation too. 3rd party applications attempting to start a second emulation may get an exception. RIM internal applications may stop another application's emulation activities, but some UI may be added behind the API to let the device user control this in the future.

NOTE: There is additional Technology Type Change listener API work that is pending. This feature will allow applications to determine if an SE's technology type is changed by some other entity. We anticipate that there will be a additional class an some additional methods added to support this.

Use Cases

Application Emulates an NDEF Tag

```
try {
    NDEFMessage ndefMessage = new NDEFMessage( );
    NDEFRecord rec1 = new NDEFRecord( );
    rec1.setId("1");
    rec1.setType(NDEFRecord.TNF_MEDIA, "text/plain");
    rec1.setPayload("zxczxczxc".getBytes( ));
    NDEFRecord rec2 = new NDEFRecord( );
    rec2.setId("2");
    rec2.setType(NDEFRecord.TNF_MEDIA, "text/plain");
    rec2.setPayload("zxczxczxc".getBytes( ));
    ndefMessage.setRecords(new NDEFRecord[ ]{rec1, rec2});
    VirtualNDEFTag vt = new VirtualNDEFTag(ndefMessage);
    vt.setVirtualTagListener(new VirtualTargetListener( )
    {
        public void virtualTargetEvent(int tagEvent) {
            switch (tagEvent) {
                case VirtualTargetListener.SELECTED:
                    // external reader has selected the tag
                    break;
                case VirtualTargetListener.TARGET_READ:
                    // external reader has read the tag
                    break;
                case VirtualTargetListener.TARGET_UPDATED:
                    // external reader has updated the tag
                    break;
                case VirtualTargetListener.READER_LEFT:
                    // external reader has left without
                    // reading/writing to a tag
                    break;
            }
        }
    });
    vt.startEmulation( );
    // do something else
    vt.stopEmulation( );
} catch (NFCException nfc) {
    // if there is a problem performing this emulation
}
```

Application Emulates an ISO14443 Target

```
try {
    VirtualISO14443TypeATarget vt = new VirtualISO14443TypeATarget(
        new VirtualISO14443TargetListener( ) {
            public void virtualTargetEvent(int tagEvent)
            {
                switch (tagEvent) {
                    case VirtualISO14443TargetListener.SELECTED:
                        // external reader has selected the tag
                        break;
                    case VirtualISO14443TargetListener.DEACTIVATED:
                        // external reader has deactivated the tag
                        break;
```

```
        }
    }
    public byte[ ] processCommand(byte[ ] command)
    {
        // process tag commands and return response in byte
        // array
        return new byte[ ] { 0x01, 0x02, 0x03, 0x04 };
    }
    });
    vt.startEmulation( );
    // do something while emulation is running
    vt.stopEmulation( );
} catch (NFCException nfc) {
    // if there is a problem performing this emulation
}
```

RIM Application Stops Tag Emulation

```
// RIM internal call to stop emulation
VirtualTarget target =
    NFCManager.getInstance( ).getActiveVirtualTarget( );
if (tag != null) {
    try {
        tag.stopEmulation( );
    } catch (NFCException e) {
        // if there is a problem performing this task
    }
}
```

Application Queries Available Secure Elements

```
SecureElement[ ] secureElements =
    SecureElementManager.getInstance( )
    .getSecureElements( );
if(secureElements != null) {
    for(int i=0; i<secureElements.length; i++) {
        // view SE properties
        secureElements[i].getType( );
        secureElements[i].getMode( );
        secureElements[i].getUri( );
    }
}
```

Application Enables and Uses a Secure Element

```
try {
    SecureElement se =
SecureElementManager.getInstance( )
        .getSecureElement(SecureElement.EMBEDDED);
    if (se == null) {
        se =
SecureElementManager.getInstance( ).getSecureElement(
            SecureElement.SIM);
    }
    if (se != null) {
        se.setMode(SecureElement.INTERNAL);
        se.setTechnologyTypes(TechnologyType.ISO14443A);
        se.addTransactionListener(new
TransactionListener( ) {
            public void transactionDetected(byte[ ] aid)
            {
                // aid may or may not be present
            }
        });
    }
    APDUConnection c = (APDUConnection)
Connector.open(se.getUri( ));
```

-continued

```
try {
    byte[ ] commandAPDU =
new byte[ ] { 0x00, (byte) 0xA4, 0x04,
            0x00, 0x05, (byte) 0xA1, 0x23,
0x22, (byte) 0xA1, 0x12, 0x00 };
    byte[ ] responseAPDU =
c.exchangeAPDU(commandAPDU);
    // check that the response was ok
} finally {
    if (c != null)
        c.close( );
}
} catch (NFCException e) {
} catch (IOException e) {
}
```

Handheld Impact

The handheld device may include an NFC chip that supports this feature.

System Security

The following security checks may be done internally to verify that applications are allowed to access the NFC tag/card emulation APIs:

Application Control: Enable/Disable NFC

IT Policy: Enable/Disable NFC

IT Policy: Enable/Disable NFC Tag/Card emulation

Other Tools Impact

Fledge devise simulator may be extended to support tag emulation functionality.

NFC Peer to Peer Communication

Overview

The NFC API may support Peer-to-Peer communication through LLCP [5]. Each end of the communication link can send application defined bytes to the other.

Description

The client and the server sides may each attempt to open a connection using the NFC API with Connector.open( ) method calls. The connection parameters appended to the URI may specify which side of the connection a device wants to be (client or server) as well LLCP [5] specific parameters. When the connection is established, the client and server may both get their Connection objects and they can send/receive data.

URI Example:

urn:nfc:sn:myService;mode=server;miu=256;timeout=120;rw=10 sn—Service Name (required)

mode—server or client (if not specified "client" is used)

miu—Maximum Information Unit (optional)

timeout—link timeout (optional)

rw—receive window size (optional)

Note: Open NFC API from Inside Contactless currently does not support setting of miu, rw and timeout LLCP parameters. It also does not support LLCP's connectionless datagram transport service.

When "mode" is not specified in the URI "mode=client" is used by default. In addition, connection parameters should include a unique "sn" service name. Multiple LLCP connections can be opened as long as each connection mode-service name pair is unique on the device.

Use Cases

Data Exchange between Two Devices (Client)

```
InputStream in = null;
OutputStream out = null;
```

-continued

```
LLCPConnection llcpConn = null;
try {
    // LLCP connection params are encoded in the
connection string
    llcpConn = (LLCPConnection) Connector.open(
"urn:nfc:sn:myService;mode=client;miu=256;timeout=120;rw=10");
    // make a request
    byte[ ] requestBytes = "This is a
request".getBytes( );
    in = llcpConn.getInputStream( );
    out = llcpConn.getOutputStream( );
    out.write(requestBytes, 0, requestBytes.length);
    // read the response
    byte[ ] buffer = new byte[1024];
    int bytesRead = 0;
    do {
        bytesRead = in.read(buffer, 0, buffer.length);
        // do something with the bytes
    } while(bytesRead >= 0);
} catch(NFCException e) {
} catch(IOException ioe) {
} finally {
    try {
        in.close( );
    } catch(IOException e) { }
    try {
        out.close( );
    } catch(IOException e) { }
    try {
        llcpConn.close( );
    } catch(IOException e) { }
}
```

Data Exchange between Two Devices (Server)

```
InputStream in = null;
OutputStream out = null;
LLCPConnectionNotifier llcpConnNotifier = null;
LLCPConnection llcpConn = null;
try {
    // LLCP connection params are encoded in the
connection string
    llcpConnNotifier = (LLCPConnectionNotifier)
Connector
.open("urn:nfc:sn:myService;mode=server;miu=256;timeout=120;rw=10
");
    llcpConn = llcpConnNotifier.acceptAndOpen( );
    in = llcpConn.getInputStream( );
    out = llcpConn.getOutputStream( );
    // read the request
    byte[ ] buffer = new byte[1024];
    int bytesRead = 0;
    do {
        bytesRead = in.read(buffer, 0, buffer.length);
        // do something with the bytes
    } while (bytesRead >= 0);
    // write a response
    byte[ ] responseBytes = "This is a
response".getBytes( );
    out.write(responseBytes, 0, responseBytes.length);
} catch (NFCException e) {
} catch (IOException ioe) {
} finally {
    try {
        in.close( );
    } catch (IOException e) {
    }
    try {
        out.close( );
    } catch (IOException e) {
    }
    try {
        llcpConn.close( );
    } catch (IOException e) {
    }
    try {
```

```
        llcpConnNotifier.close( );
    } catch (IOException e) {
    }
}
```

Handheld Impact
   The handheld device may include an NFC chip that supports this feature.

System Security
   The following security checks may be done internally to verify that applications are allowed to access the NFC Peer to Peer APIs:
   Application Control: Enable/Disable NFC
   IT Policy: Enable/Disable NFC
   IT Policy: Enable/Disable NFC Peer to Peer mode Other Tools Impact
   Fledge device simulator may be extended to support emulation of device NFC interactions.

Bluetooth Connection Handover Using NFC

Overview
   The API will supports establishing Bluetooth connections using NFC to determine connection parameters. Protocol is described in [2,6].

Description
   Connection Handover can be accomplished through an LLCP connection or by detecting an NFC tag that contains a connection handover NDEF record.
   A single RIM application will listen for connection handover NDEF tags/records as well as for LLCP peers using a service name of "urn:nfc:sn:handover". It will use a connection type of "any" so that it may end up being the requestor or selector for the connection handover NDEF exchange.
   Applications may register their interest in connection handovers for specific types of transport, along with a listener to handle them. The applications will receive connection metadata as part of the listener callback they receive when a Bluetooth peer is tapped on. It is up to them to decide the context of the tap and establish the connection if appropriate.
   A 3rd party application may check whether the connection handover is the result of a static or negotiated exchange by inspecting the connection event instance.

Use Cases

Connection Handover

```
try {
NFCConnectionHandoverManager.getInstance( )
    .addConnectionHandoverEventHandler(
    new ConnectionHandoverEventHandler( ) {
        public void connectionHandoverCompleted(
            ConnectionHandoverCompletedEvent event) {
            if (event.getTransportType( ) ==
ConnectionHandoverEvent.BLUETOOTH_TRANSPORT
                && (event.getEventType( ) ==
ConnectionHandoverEvent.SELECTOR_P2P_DETECTED || event
                    .getEventType( ) ==
ConnectionHandoverEvent.SELECTOR_TAG_READ)) {
            BluetoothConnectionHandoverCompletedEvent
bte =
                (BluetoothConnectionHandoverCompletedEvent)
event;
                // do something with BT data
                bte.getClassOfDevice( );
                bte.getDeviceAddress( );
                bte.getDeviceName( );
                bte.getServiceClassUUID( );
            }
        }
        public void connectionHandoverFailed(
            ConnectionHandoverFailedEvent event) {
// handle failure
        }
    }, ConnectionHandoverEvent.BLUETOOTH_TRANSPORT,
    false);
} catch (NFCException nfce) {
    // unable to register listener
}
```

Handheld Impact
   The handheld device may include an NFC chip that supports this feature.

System Security
   The following security checks may be provided to verify that applications are allowed to access the NFC APIs underneath the Connection Handover API. Note that access to the Connection Handover API may not be restricted directly because the lower level APIs could allow a malicious app to implement its own Connection Handover, thus circumventing the checks:
   Application Control: Enable/Disable NFC
   IT Policy: Enable/Disable NFC
   IT Policy: Enable/Disable NFC Peer to Peer mode
   IT Policy: Enable/Disable NFC Read/Write mode Other Tools Impact
   Fledge device simulator may be extended to support emulation of NFC tag reading functionality.

NFC Configuration API

Overview
   The API provides ways to query for NFC availability, enable or disable different NFC features, and listen for changes in feature availability for an application.

Description
   The NFC API integrates with the Device Capability API so that 3rd party applications can determine, in a standard way, if NFC is supported. Applications may also listen for high level NFC availability change notifications.
   Applications may use a lower level API to track NFC Status Changes. This is particularly useful for situations where an application loses access to an NFC feature due to contention with another application. The difference between this API and the device capability API is that the first one tracks device status and the second one customizes the status for each application to handle conflicts. E.g., Secure Element APIs may be available to the foreground application, but not available fox other applications.
   There are also internal APIs for enabling and disabling different parts of the API, as well as methods to help configure which NFC service should require the application to be running in the foreground.

Use Cases

Application Checks Device Capabilities

```
    // check if NFC is supported
    boolean supported = DeviceCapability.isNFCSupported( );
    // check if NFC is available
    boolean available = DeviceCapability.isNFCAvailable( );
    // listen for changes in device NFC capabilities
    DeviceCapability.addNFCListener(new
DeviceCapabilityListener( ) {
```

-continued

```
        public void supportedChanged( boolean changedTo ) {
            // this should never happen
        }
        public void allowedChanged( boolean changedTo ) {
            // should never happen
        }
        public void availableChanged( boolean changedTo ) {
            // might happen if user disabled NFC
        }
    });
```

Application Checks if an NFC Feature is Available

```
        NFCManager nfc = NFCManager.getInstance( );
        boolean p2pAvailable =
    nfc.isNFCAvailable(NFCManager.NFC_PEER_TO_PEER);
```

Internal Application Configures NFC

```
    // example of how to enable everything except P2P
NFCManager nfc = NFCManager.getInstance( );
        nfc.setEnabledNFCServices(NFCManager.NFC_ALL);
nfc.setEnabledNFCServices
(~NFCManager.NFC_PEER_TO_PEER_CLIENT);
    // require foreground for all tag / card emulation
        nfc.setForegroundOnlyNFCServices(
NFCManager.-
NFC_EMBEDDED_SECURE_ELEMENT_CARD_EMULATION |
NFCManager.NFC_UICC_CARD_EMULATION |
NFCManager.NFC_TAG_CARD_EMULATION);
```

Internal Application Listens for NFC Status Events

```
        NFCManager nfc = NFCManager.getInstance( );
        nfc.addNFCStatusListener(new NFCStatusListener( ) {
            public void onStatusChange(int nfcFeature, int status) {
                // can react to changes in NFC availablity for a given
    application
            }
        });
```

Handheld Impact
  The handheld device may include an NFC chip that supports this feature.
System Security
  RIM applications signed with 3.key may be allowed to access the internal configuration APIs.
Definitions

| Term | Definition |
| --- | --- |
| Tag | Passive RFID tag. Contains data that can be accessed by a reader/writer. Does not have an independent power source. |
| Card | Passive RFID Card. Runs an operating system. Responds to APDU commands with APDU responses. Does not have an independent power source. Gets it power for the NFC reader. |
| Reader | Generates an RF field that can be used to interact with tags or cards. Requires a power source to operate. |
| Secure Element | Tamper resistant chip embedded in the device or on a SIM that can securely store applications and data. |

-continued

| Term | Definition |
| --- | --- |
| Applet | In this document, an Applet refers to a Smart Card application that can be deployed to a secure element and emulate a physical Smart Card. |
| ISO 7816-4 | ISO standard for APDUs |
| Negotiated Connection Handover | In the NFC Connection Handover spec [2], a negotiated connection handover is where a "requester" specifies to a "selector" what transports it has available, and the selector picks one and references it in the response. This request-response exchange is done over a NFC P2P connection. |
| Static Connection Handover | In the NFC Connection Handover spec [2], a static connection handover is where the selector side is represented by an NFC tag containing the connection parameters. The requester reads the tag and establishes the connection. |

Acronyms

| Acronym | Definition |
| --- | --- |
| NFC | Near Field Communication |
| NDEF | NFC Data Exchange Format |
| APDU | Application Protocol Data Unit. Data format used for Secure Element/Smart Card request and responses |
| LLCP | Logical Link Control Protocol |

Example components of a mobile wireless communications device 1000 that may be used in accordance with the above-described embodiments are further described below with reference to FIG. 11. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 11:
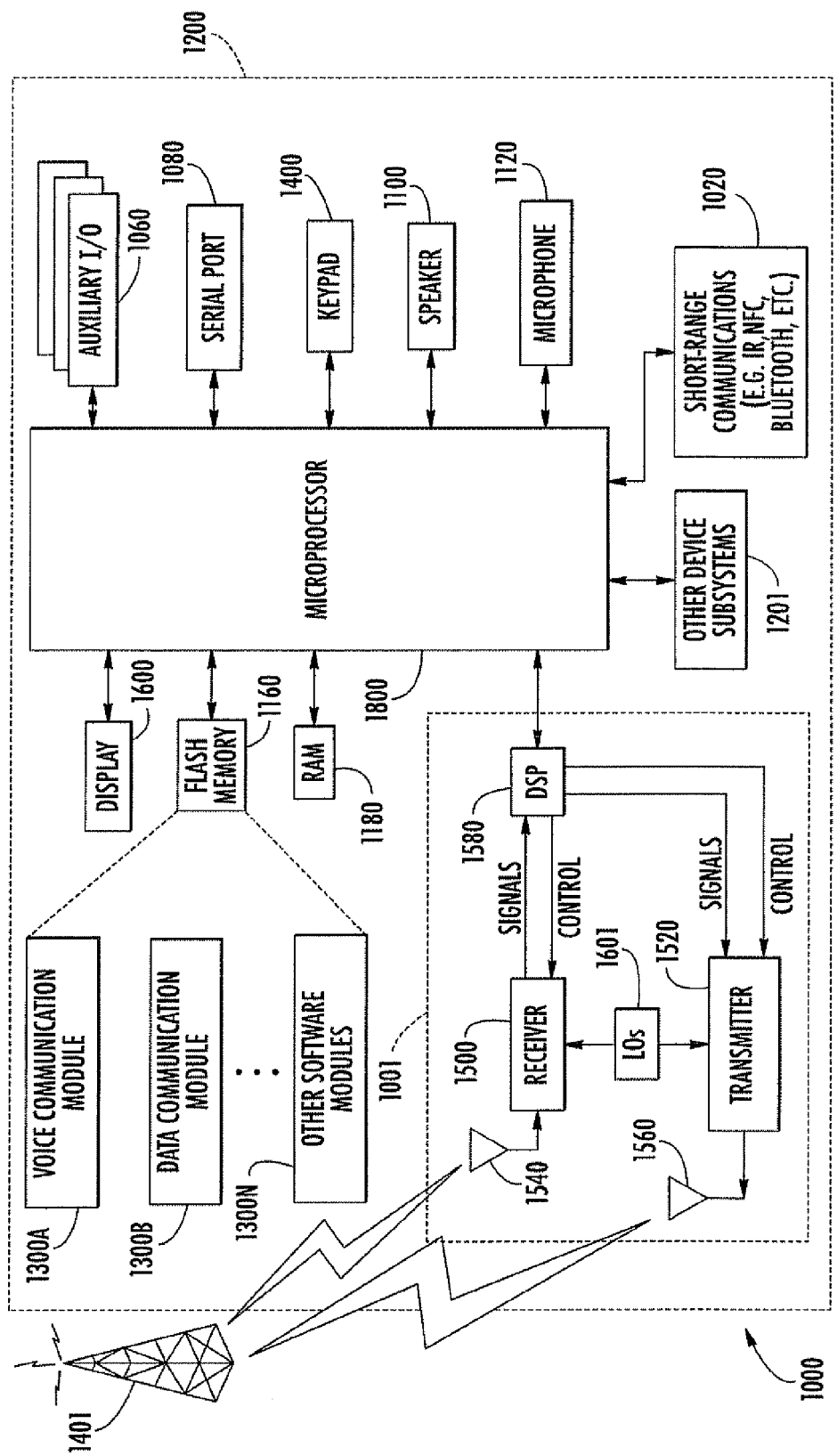
FIG. 11 is a schematic block diagram illustrating example components which may used in the mobile wireless communications device of FIG. 1.

In addition to the processing device 1800, other parts of the mobile device 1000 are shown schematically in FIG. 11. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM)

1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A communications system comprising:
a plurality of electronic devices having respective different device types, and each electronic device being configured to wirelessly communicate via a plurality of different wireless communications formats; and
a mobile wireless communications device comprising a microprocessor configured to implement
a plurality of application modules associated with respective electronic device types and configured to communicate via a first format of the plurality of wireless communications formats, and
a control module configured to
establish an initial wireless communications link with a given electronic device using a second format of the plurality of wireless communications formats,
determine a respective device type for said given electronic device based upon the established initial wireless communications link, and
cause a respective application module to establish a subsequent wireless communications link with said given electronic device using the first wireless communications format based upon the determined respective device type.

2. The communications system of claim 1 wherein the second wireless communications format comprises a near-field communication (NFC) format.

3. The communications system of claim 1 wherein the first wireless communications format comprises a Bluetooth format.

4. The communications system of claim 1 wherein the first wireless communications format comprises a wireless local area network (WLAN) format.

5. The communications system of claim 1 wherein the first wireless communications format comprises a cellular communications format.

6. The communications system of claim 1 wherein said application modules are further configured to register respective electronic device types with said control module.

7. The communications system of claim 1 wherein said plurality of application modules comprises at least one of an image application module, a video application module, an audio application module, or an Internet browser application module.

8. A mobile wireless communication device for use with a plurality of electronic devices having respective different device types, and each of the plurality of electronic devices being configured to wirelessly communicate via a plurality of different wireless communications formats, the mobile wireless communications device comprising:
 a microprocessor configured to implement
  a plurality of application modules associated with respective electronic device types and configured to communicate via a first format of the plurality of wireless communications formats; and
  a control module configured to
   establish an initial wireless communications link with a given electronic device using a second format of the plurality of wireless communications formats,
   determine a respective device type for the given electronic device based upon the established initial wireless communications link, and
   cause a respective application module to establish a subsequent wireless communications link with the given electronic device using the second wireless communications format based upon the determined respective device type.

9. The mobile wireless communications device of claim 8 wherein the second wireless communications format comprises a near-field communication (NFC) format.

10. The mobile wireless communications device of claim 8 wherein the first wireless communications format comprises a Bluetooth format.

11. The mobile wireless communications device of claim 8 wherein said application modules are further configured to register respective electronic device types with said control module.

12. The mobile wireless communications device of claim 8 wherein said plurality of application modules comprises at least one of an image application module, a video application module, an audio application module, or an Internet browser application module.

13. A communications method for a mobile wireless communication device for use with a plurality of electronic devices having respective different device types and each configured to wirelessly communicate via a plurality of different wireless communications formats, the method comprising:
 establishing an initial wireless communications link between the mobile wireless communications device and a given electronic device, the mobile wireless communication device comprising a plurality of application modules associated with respective electronic device types and configured to communicate via a first format of the plurality of wireless communications formats, and wherein the initial wireless communications link is established using a second format of the plurality of wireless communications formats;
 determining a respective device type for the given electronic device based upon the established initial wireless communications link; and
 establishing a subsequent wireless communications link between a respective application module and the given electronic device using the second wireless communications format based upon the determined respective device type.

14. The method of claim 13 wherein the second wireless communications format comprises a near-field communication (NFC) format.

15. The method of claim 13 wherein the first wireless communications format comprises a Bluetooth format.

16. A non-transitory computer-readable medium for a mobile wireless communications device comprising a microprocessor, the mobile wireless communications device for use with a plurality of electronic devices having respective different device types, and each of the plurality of electronic devices being configured to wirelessly communicate via a plurality of different wireless communications formats, and the non-transitory computer-readable medium having computer-executable instructions for causing the microprocessor to implement modules comprising:
 a plurality of application modules associated with respective electronic device types and configured to communicate via a first format of the plurality of wireless communications formats; and
 a control module configured to
  establish an initial wireless communications link with a given electronic device using a second format of the plurality of wireless communications formats,
  determine a respective device type for the given electronic device based upon the established initial wireless communications link, and
  cause a respective application module to establish a subsequent wireless communications link with the given electronic device using the second wireless communications format based upon the determined respective device type.

17. The non-transitory computer-readable medium of claim 16 wherein the second wireless communications format comprises a near-field communication (NFC) format.

18. The non-transitory computer-readable medium of claim 16 wherein the first wireless communications format comprises a Bluetooth format.

19. The non-transitory computer-readable medium of claim 16 wherein said application modules are further configured to register respective electronic device types with said control module.

20. The non-transitory computer-readable medium of claim 16 wherein said plurality of application modules comprises at least one of an image application module, a video application module, an audio application module, or an Internet browser application module.

21. The communications system of claim 6 wherein said control module is further configured to notify the respective application module to establish the subsequent wireless communications link based upon the registration by said respective application module with said control module and the determined respective device type.

22. The mobile wireless communications device of claim 11 wherein said control module is further configured to notify said respective application module to establish the subsequent wireless communications link based upon the registration by said respective application module with said control module and the determined respective device type.

23. The method of claim 13 further comprising registering respective electronic device types for the application modules with the mobile wireless communications device.

24. The method of claim 23 further comprising notifying the respective application module to establish the subsequent wireless communications link based upon the registration by the respective application module with the mobile wireless communications device and the determined respective device type.

25. The non-transitory computer-readable medium of claim 19 wherein said control module is further configured to notify said respective application module to establish the subsequent wireless communications link based upon the registration by said respective application module with said control module and the determined respective device type.

* * * * *